(12) United States Patent
Jung

(10) Patent No.: US 11,654,909 B2
(45) Date of Patent: May 23, 2023

(54) PLATOONING CONTROLLER, SYSTEM INCLUDING THE SAME, AND BRAKING CONTROL METHOD THEREOF

(71) Applicants: Hyundai Motor Company, Seoul (KR); Kia Motors Corporation, Seoul (KR)

(72) Inventor: Sung Chil Jung, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 291 days.

(21) Appl. No.: 17/092,549

(22) Filed: Nov. 9, 2020

(65) Prior Publication Data
US 2021/0402995 A1 Dec. 30, 2021

(30) Foreign Application Priority Data
Jun. 26, 2020 (KR) ........................ 10-2020-0078290

(51) Int. Cl.
 *B60W 30/165* (2020.01)
 *G05D 1/02* (2020.01)
 (Continued)

(52) U.S. Cl.
 CPC ............ *B60W 30/165* (2013.01); *B60T 8/92* (2013.01); *B60W 10/18* (2013.01); *B60W 30/09* (2013.01);
 (Continued)

(58) Field of Classification Search
 CPC .... B60W 30/165; B60W 10/18; B60W 30/09; B60W 30/17; B60W 30/18109; B60W 2050/0075; B60W 2556/65; B60W 30/08; B60W 40/105; B60W 60/0016; B60W 2050/0005; B60W 2552/50; B60W 2720/10; B60T 8/92; B60T 2201/022; B60T 2201/10; B60T 7/22; B60T 17/18; B60T 17/221; B60T 2201/03; G05D 1/0293;
 (Continued)

(56) References Cited

U.S. PATENT DOCUMENTS 10,089,882 B2 * 10/2018 Pandy .................... B60W 30/16
10,921,821 B2 * 2/2021 Lesher .................. G01S 13/931
(Continued)

FOREIGN PATENT DOCUMENTS

KR 101262419 B1 5/2013

*Primary Examiner* — Jason Holloway
(74) *Attorney, Agent, or Firm* — Slater Matsil, LLP

(57) ABSTRACT

A platooning controller includes a processor configured to share information about a first platooning vehicle of a group of platooning vehicles with other platooning vehicles of the group of platooning vehicles when a brake of the first platooning vehicle breaks down during platooning and to perform braking control, and a storage configured to store data and an algorithm for platooning and braking control by the processor. The processor is configured to rearrange the group of platooning vehicles depending on a location where the first platooning vehicle is arranged in a platoon line, to decelerate the first platooning vehicle and a second platooning vehicle in front of the first platooning vehicle, and to center the first platooning vehicle and the second platooning vehicle to perform the braking control.

20 Claims, 14 Drawing Sheets

(51) Int. Cl.
*H04W 4/46* (2018.01)
*B60W 10/18* (2012.01)
*B60T 8/92* (2006.01)
*B60W 30/18* (2012.01)
*B60W 30/09* (2012.01)
*B60W 30/17* (2020.01)
*B60W 50/00* (2006.01)

(52) U.S. Cl.
CPC ...... *B60W 30/17* (2013.01); *B60W 30/18109* (2013.01); *G05D 1/0293* (2013.01); *H04W 4/46* (2018.02); *B60W 2050/0075* (2013.01); *B60W 2556/65* (2020.02); *G05D 2201/0213* (2013.01)

(58) Field of Classification Search
CPC ........ G05D 2201/0213; G05D 1/0291; H04W 4/46; H04W 4/023; G08G 1/22; B60Y 2300/08
See application file for complete search history.

(56) References Cited

U.S. PATENT DOCUMENTS

2018/0188746 A1* 7/2018 Lesher ................. G05D 1/0287
2020/0027355 A1* 1/2020 Sujan ................... H04W 4/023

* cited by examiner

PLATOONING CONTROLLER, SYSTEM INCLUDING THE SAME, AND BRAKING CONTROL METHOD THEREOF

CROSS-REFERENCE TO RELATED APPLICATIONS

This application claims the benefit of Korean Application No. 10-2020-0078290, filed on Jun. 26, 2020, which application is hereby incorporated herein by reference.

TECHNICAL FIELD

The present disclosure relates to a platooning controller, a system including the same, and a braking control method thereof.

BACKGROUND

Platooning is a technology in which a plurality of vehicles perform autonomous driving in the state where they are arranged at a specified interval in line. While the plurality of vehicles are platooning, a leading vehicle which is a vehicle located in the frontline of a platooning line may control one or more following vehicles which follow the leading vehicle.

When there is a vehicle, the brake of which breaks down, during platooning, the vehicle which breaks down brakes using a retarder which is a sub-braking device or a normal vehicle which does not break down moves and brakes in front of the vehicle which breaks down, thus stopping the vehicle, the brake of which breaks down.

However, when braking using only a retarder, because a large truck, the weight of which is heavy, has a long braking distance, it is difficult to quickly correspond to an emergency situation of the road. Furthermore, when a normal vehicle brakes in front of a vehicle which breaks down, vehicle damage may occur due to an impact upon collision. When an impact is not applied to the center of the vehicle, vehicles rotate each other to pass the line and have a harmful influence on stability.

SUMMARY

The present disclosure may solve problems occurring in the prior art while advantages achieved by the prior art are maintained intact.

The present disclosure relates to a platooning controller, a system including the same, and a braking control method thereof. Particular embodiments relate to technologies of controlling emergency braking as it is impossible to perform a braking operation during platooning.

An embodiment of the present disclosure provides a platooning controller for actively performing braking control of a vehicle, the brake of which breaks down, during platooning depending on a surrounding road situation to reduce a braking distance and stop the vehicle, the brake of which breaks down, without collision or damage with a surrounding vehicle, a system including the same, and a braking control method thereof.

Technical problems to be solved by the inventive concept are not limited to the aforementioned problems, and any other technical problems not mentioned herein will be clearly understood from the following description by those skilled in the art to which the present disclosure pertains.

According to an embodiment of the present disclosure, a platooning controller may include a processor that shares information about a vehicle, the brake of which breaks down, with platooning vehicles when there is the vehicle, the brake of which breaks down, during platooning and performs braking control and a storage storing data and an algorithm for platooning and braking control by the processor. The processor may rearrange the platooning vehicles depending on a location where the vehicle, the brake of which breaks down, is arranged in a platoon line, may decelerate the vehicle which breaks down and a vehicle in front of the vehicle which breaks down, and may center the vehicle which breaks down and the vehicle in front of the vehicle which breaks down to perform braking control.

In an embodiment, the processor may control the vehicle which breaks down such that an inter-vehicle distance between the vehicle which breaks down and the vehicle in front of the vehicle which breaks down becomes "0" in the state where the vehicle which breaks down and the vehicle in front of the vehicle which breaks down are centered.

In an embodiment, the processor may determine whether a road situation is an emergency braking situation or a general braking situation, when the inter-vehicle distance between the vehicle which breaks down and the vehicle in front of the vehicle which breaks down becomes "0".

In an embodiment, the processor may determine the road situation as the emergency braking situation, when a distance from a forward obstacle is short and when it is impossible to avoid a collision with the obstacle, and may determine the road situation as the general braking situation, when the distance from the forward obstacle is long and when it is possible to avoid the collision with the obstacle.

In an embodiment, the processor may control the vehicle in front of the vehicle which breaks down to brake at a deceleration of a predetermined reference value or more, when the road situation is the emergency braking situation, and may control the vehicle in front of the vehicle which breaks down to brake at a deceleration of less than the predetermined reference value, when the road situation is the general braking situation.

In an embodiment, the processor may give the authority of a leading vehicle among the platooning vehicles to a first following vehicle which follows the leading vehicle behind the leading vehicle and may control the first following vehicle to move in front of the leading vehicle, when the brake of the leading vehicle breaks down.

In an embodiment, the processor may perform deceleration control by means of a main braking device of a leading vehicle and may perform deceleration control using a sub-braking device of a first following vehicle which follows the leading vehicle behind the leading vehicle, such that an inter-vehicle distance between the leading vehicle and the first following vehicle becomes "0", when the brake of the first following vehicle breaks down.

In an embodiment, the processor may determine the number of the platooning vehicles, when the brake of a tail end vehicle among the platooning vehicles breaks down.

In an embodiment, the processor may transmit a command to move behind the tail end vehicle to a vehicle in front of the tail end vehicle, when the number of the platooning vehicles is greater than a predetermined number.

In an embodiment, the processor may transmit a control command to the vehicle which breaks down such that an inter-vehicle distance from the vehicle in front of the vehicle which breaks down becomes "0".

In an embodiment, the processor may control the vehicle which breaks down to perform deceleration control by means of a sub-braking device and may control the vehicle in front of the vehicle which breaks down by means of a main braking device.

In an embodiment, the processor may control a leading vehicle to move to a tail end in the platoon line, when the number of the platooning vehicles is 3.

In an embodiment, the processor may control a following vehicle behind the vehicle which breaks down to increase an inter-vehicle distance from the vehicle in front of the following vehicle behind the vehicle which breaks down, during braking control of the vehicle which breaks down.

According to another embodiment of the present disclosure, a vehicle system may include a sensing device that senses information for platooning, a sub-braking device that brakes when a main braking device breaks down, and a platooning controller that shares information about a vehicle, the brake of which breaks down, with platooning vehicles when there is the vehicle, the brake of which breaks down, during platooning, rearranges the platooning vehicles depending on a location where the vehicle, the brake of which breaks down, is arranged in a platoon line, decelerates the vehicle which breaks down and a vehicle in front of the vehicle which breaks down, and centers the vehicle which breaks down and the vehicle in front of the vehicle which breaks down to perform braking control.

In an embodiment, the sensing device may sense an inter-vehicle distance between the vehicle in front of the vehicle which breaks down and a vehicle behind the vehicle which breaks down, a vehicle speed, or an offset amount of the center of the vehicle in front of the vehicle which breaks down and a host vehicle.

According to another embodiment of the present disclosure, a platooning control method may include sharing information about a vehicle, the brake of which breaks down, with platooning vehicles, when there is the vehicle, the brake of which breaks down, during platooning, rearranging the platooning vehicles depending on a location where the vehicle, the brake of which breaks down, is arranged in a platoon line, and decelerating the vehicle which breaks down and a vehicle in front of the vehicle which breaks down and centering the vehicle which breaks down and the vehicle in front of the vehicle which breaks down to perform braking control.

In an embodiment, the performing of the braking control may include controlling the vehicle which breaks down such that an inter-vehicle distance between the vehicle which breaks down and the vehicle in front of the vehicle which breaks down becomes "0" in the state where the vehicle which breaks down and the vehicle in front of the vehicle which breaks down are centered.

In an embodiment, the performing of the braking control may include determining whether a road situation is an emergency braking situation or a general braking situation, when the inter-vehicle distance between the vehicle which breaks down and the vehicle in front of the vehicle which breaks down becomes "0", controlling the vehicle in front of the vehicle which breaks down at a deceleration of a predetermined reference value or more, when the road situation is the emergency braking situation, and controlling the vehicle in front of the vehicle which breaks down at a deceleration of less than the predetermined reference value, when the road situation is the general braking situation.

In an embodiment, the rearranging of the platooning vehicles may include giving of the authority of a leading vehicle among the platooning vehicles to a first following vehicle which follows the leading vehicle behind the leading vehicle and controlling the first following vehicle to move in front of the leading vehicle, when the brake of the leading vehicle breaks down.

In an embodiment, the rearranging of the platooning vehicles may include performing deceleration control by means of a main braking device of a leading vehicle and performing deceleration control using a sub-braking device of a first following vehicle which follows the leading vehicle behind the leading vehicle, when the brake of the first following vehicle breaks down.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
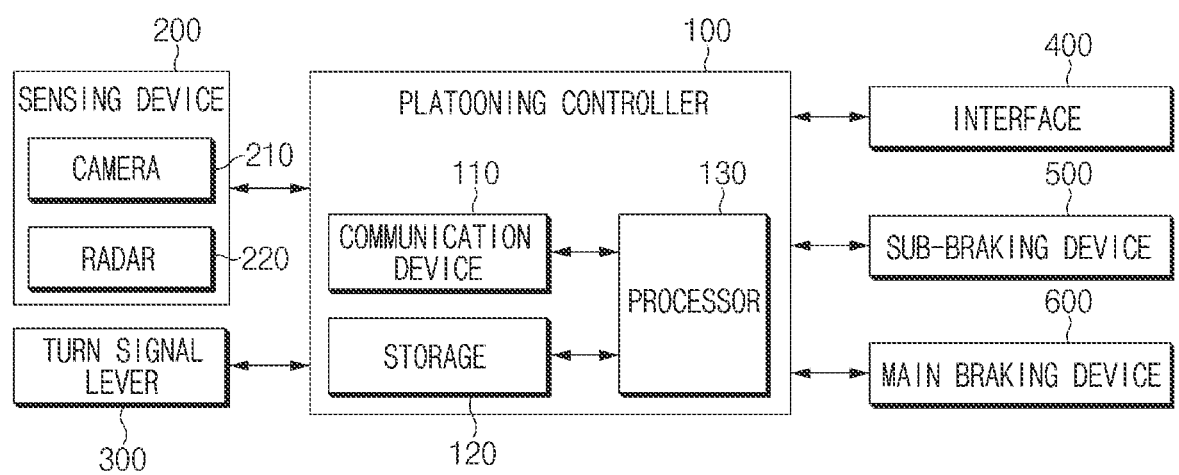
FIG. 1 is a block diagram illustrating a configuration of a vehicle system including a platooning controller according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

FIG. 1 is a block diagram illustrating a configuration of a vehicle system including a platooning controller according to an embodiment of the present disclosure.

Referring to FIG. 1, the vehicle system may include a platooning controller 100, a sensing device 200, a turn signal lever 300, an interface 400, a sub-braking device 500, and a main braking device 600.

When there is a vehicle, the brake (a main braking device) of which breaks down, during platooning, the platooning controller 100 may share information about the vehicle, the brake (the main braking device) of which breaks down, with platooning vehicles to perform braking control. Furthermore, the platooning controller 100 may rearrange the platooning vehicles depending on a location where the vehicle, the brake of which breaks down, is arranged in a platoon line, and may decelerate the vehicle which breaks down and a vehicle in front of the vehicle which breaks down to perform braking control.

The platooning controller 100 according to an embodiment of the present disclosure may be implemented in a host vehicle. In this case, the platooning controller 100 may be integrally configured with control units in the host vehicle or may be implemented as a separate device to be connected with the control units of the host vehicle by a separate connection means.

The platooning controller 100 may include a communication device 110, a storage 120, and a processor 130.

The communication device 110 may be a hardware device implemented with various electronic circuits to transmit and receive a signal through a wireless or wired connection. In an embodiment of the present disclosure, the communication device 110 may perform a network communication technology in the vehicle and may perform vehicle-to-infrastructure (V2I) communication with a server, an infrastructure, or another vehicle outside the vehicle using wireless Internet technology or short range communication technology. Herein, the network communication technology in the vehicle may be to perform inter-vehicle communication through controller area network (CAN) communication, local interconnect network (LIN) communication, flex-ray communication, or the like. Furthermore, the wireless Internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may share platooning information between vehicles in a platoon line. In this case, the platooning information may include information about a location, a speed, or a destination of the vehicle.

The storage 120 may store data, an algorithm, and/or the like necessary for an operation of the platooning controller 100, for example, the sensing result of the sensing device 200, vehicle information of vehicles in a platoon line, which is received by the communication device 110, and data obtained by the processor 130.

As an example, the storage 120 may store brake breakdown information of vehicles in a platoon line, which is received through vehicle-to-everything (V2X) communication, and may store information about a vehicle speed, an inter-vehicle distance from a forward vehicle, or a center offset between the forward vehicle and the host vehicle. Furthermore, the storage 120 may store information about a forward obstacle, for example, a forward vehicle, (e.g., a distance from the obstacle, a speed of the obstacle, or the like), detected by the sensing device 200.

Furthermore, the storage 120 may store road situation information obtained by the processor 130 and a command, an algorithm, and/or the like for safe braking control when there is a vehicle, a main braking device (the brake) of which breaks down, among platooning vehicles.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, or the like and may electrically control the respective components. The processor 130 may be an electrical circuit which executes instructions of software and may perform a variety of data processing and calculation described below. The processor 130 may be, for example, an electronic control unit (ECU), a micro controller unit (MCU), or another sub-controller, which is loaded into the vehicle.

When there is a vehicle, the brake of which breaks down, during platooning, the processor 130 may share information on the occurrence of the breakdown (e.g., a location of the vehicle which breaks down, a role of the vehicle which breaks down, a speed of the vehicle which breaks down, an inter-vehicle distance from the vehicle which breaks down, a center offset between a vehicle in front of the vehicle which breaks down and the host vehicle, or the like) with platooning vehicles, may rearrange the platooning vehicles depending on a location where the vehicle, the brake of which breaks down, which performs braking control, is arranged in a platoon line, and may decelerate the vehicle which breaks down and the vehicle in front of the vehicle which breaks down to perform braking control.

The processor 130 may center the vehicle which breaks down and the vehicle in front of the vehicle which breaks down and may control the vehicle which breaks down such that an inter-vehicle distance between the vehicle which breaks down and the vehicle in front of the vehicle which breaks down becomes "0". In this case, when the inter-vehicle distance between the vehicle which breaks down and the vehicle in front of the vehicle which breaks down becomes "0", because there is a concern that the vehicles will be damaged when the vehicle which breaks down and the vehicle in front of the vehicle which breaks down are not centered, the processor 130 may control such that the center of the vehicle which breaks down and the center of the vehicle in front of the vehicle which breaks down are identical to each other based on an offset amount of the center of the vehicle in front of the vehicle which breaks down and the host vehicle, which is measured by the sensing device 200.

When the inter-vehicle distance between the vehicle which breaks down and the vehicle in front of the vehicle which breaks down becomes "0", the processor 130 may determine whether the road situation is an emergency braking situation or a general braking situation.

When a distance from a forward obstacle is short and when it is impossible to avoid a collision with the obstacle, the processor 130 may determine the road situation as the emergency braking situation. When the distance from the forward obstacle is long and when it is possible to avoid a collision with the obstacle, the processor 130 may determine the road situation as the general braking situation. In other words, because it is impossible to avoid the collision with the forward obstacle and because the distance from the forward obstacle is close, when there is a need for high deceleration of a predetermined reference value (e.g., 0.4 g), the processor 130 may determine the road situation as an emergency situation. Furthermore, because it is possible to avoid the collision with the forward obstacle and because the distance from the forward obstacle is distant, when there is a need for low deceleration of less than the predetermined reference value, the processor 130 may determine the road situation as a general situation.

When the road situation is the emergency braking situation, the processor 130 may control a forward vehicle to brake at a deceleration of a predetermined reference value or more. When the road situation is the general braking situation, the processor 130 may control the forward vehicle to brake at a deceleration of less than the predetermined reference value.

When the brake of a leading vehicle among platooning vehicles breaks down, the processor 130 may give the authority of the leading vehicle to a first following vehicle which follows the leading vehicle behind the leading vehicle and may control the first following vehicle to move in front of the leading vehicle.

When the brake of the first following vehicle which follows the leading vehicle behind the leading vehicle breaks down, the processor 130 may perform deceleration control by means of a main braking device of the leading vehicle and may perform deceleration control using a sub-braking device of the first following vehicle, such that an inter-vehicle distance between the leading vehicle and the first following vehicle becomes "0".

When the brake of a tail end vehicle among the platooning vehicles breaks down, the processor 130 may determine the number of the platooning vehicles. When the number of the platooning vehicles is less than 3, that is, when the number of the platooning vehicles is 2, the processor 130 may perform braking control without resetting the vehicles.

When the number of the platooning vehicles is greater than a predetermined number (e.g., 3), the processor 130 may transmit a command to move behind the tail end vehicle to a vehicle in front of the tail end vehicle. In other words, the processor 130 may transmit a control command to the vehicle which breaks down such that an inter-vehicle distance from the vehicle in front of the vehicle which breaks down becomes "0" to control the vehicle which breaks down to perform deceleration control by means of a sub-braking device and control the vehicle in front of the vehicle which breaks down to perform deceleration control by means of a main braking device such that the inter-vehicle distance becomes "0".

When the number of platooning vehicles is 3, the processor 130 may control a leading vehicle to move to the tail end in a platoon line and may decelerate a vehicle which breaks down and a vehicle in front of the vehicle which breaks down such that an inter-vehicle distance becomes "0" to perform braking control.

While performing braking control of the vehicle which breaks down, the processor 130 may control a following vehicle behind the vehicle which breaks down to increase an inter-vehicle distance from the vehicle in front of the following vehicle behind the vehicle which breaks down to prevent a collision with following vehicles upon the braking control of the vehicle which breaks down.

The sensing device 200 may include one or more sensors, each of which detects an obstacle located around the host vehicle, for example, a preceding vehicle, and measures a distance from the obstacle and/or a relative speed of the obstacle.

The sensing device 200 may have a plurality of sensors for sensing objects outside the vehicle and may obtain information about a location of the object, a speed of the object, a movement direction of the object, and/or a type (e.g., a vehicle, a pedestrian, a bicycle, a motorcycle, or the like) of the object. To this end, the sensing device 200 may include a camera 210 and a radar 220. Although not illustrated in FIG. 1, the sensing device 200 may further include an ultrasonic sensor, a laser scanner and/or a corner radar, a light detection and ranging (LiDAR), an acceleration sensor, a yaw rate sensor, a torque sensor and/or a wheel speed sensor, a steering angle sensor, or the like. The camera 210 may obtain data for recognizing a wheel of a forward vehicle and the center of the forward vehicle. The radar 220 may measure a distance from the forward vehicle and may provide the measured distance to the platooning controller 100.

The turn signal lever 300 may be to identify the lane change will of the driver. When a turn signal is turned on/off, the turn signal lever 300 may be configured as a multi-function switch.

The interface 400 may include an input means for receiving a control command from a user and an output means for outputting an operation state, an operation result, or the like of the platooning controller 100.

Herein, the input means may include a key button and may further include a mouse, a joystick, a jog shuttle, a stylus pen, or the like. Furthermore, the input means may further include a soft key implemented on a display.

The output means may provide the driver with a platooning situation. To this end, the output means may include the display and a voice output means such as a speaker. In this case, a touch sensor such as a touch film, a touch sheet, or a touch pad is provided in the display, the display operates as a touchscreen and may be implemented in a form where the input means and the output means are integrated with each other.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

When the main braking device 600 (the brake) of the host vehicle breaks down, the sub-braking device 500 may perform sub-braking of the host vehicle and may be implemented as an exhaust brake, a retarder, or the like.

The main braking device 600 may perform braking control of the host vehicle.

Figure 2:
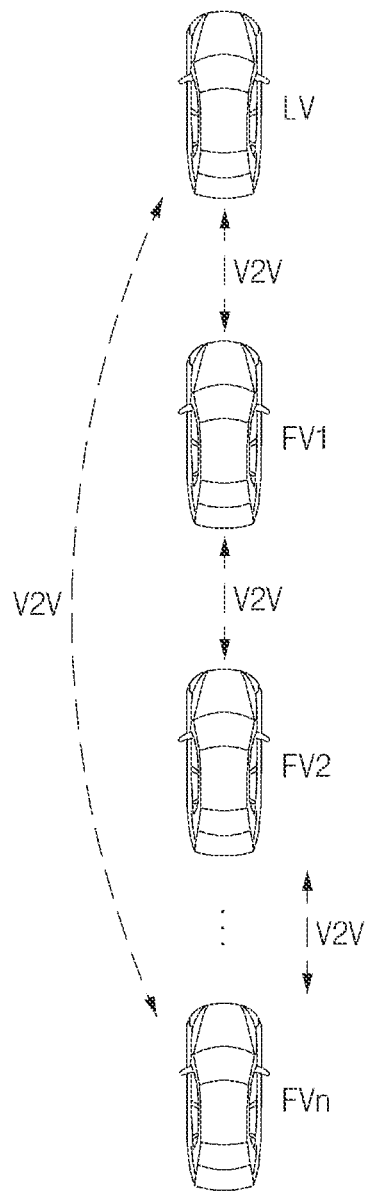
FIG. 2 is a drawing illustrating an exemplary screen of normal vehicle platooning according to an embodiment of the present disclosure.

FIG. 2 is a drawing illustrating an exemplary screen of normal vehicle platooning according to an embodiment of the present disclosure.

Referring to FIG. 2, a leading vehicle LV and following vehicles FV1 to FVn, which are included in a platooning group, may perform platooning on the road. The leading vehicle LV and the following vehicles FV1 to Fvn may travel while maintaining a specified distance. While driving, the leading vehicle LV or the following vehicles FV1 to FVn may adjust a distance between the leading vehicle LV and the following vehicles FV1 to FVn. The leading vehicle LV or the following vehicles FV1 to FVn may increase or decrease an inter-vehicle distance depending on manipulation of a driver.

Hereinafter, a description will be given of a braking control method when the brake of a leading vehicle breaks down during platooning with reference to FIGS. 3A to 3C.

Figure 3A:
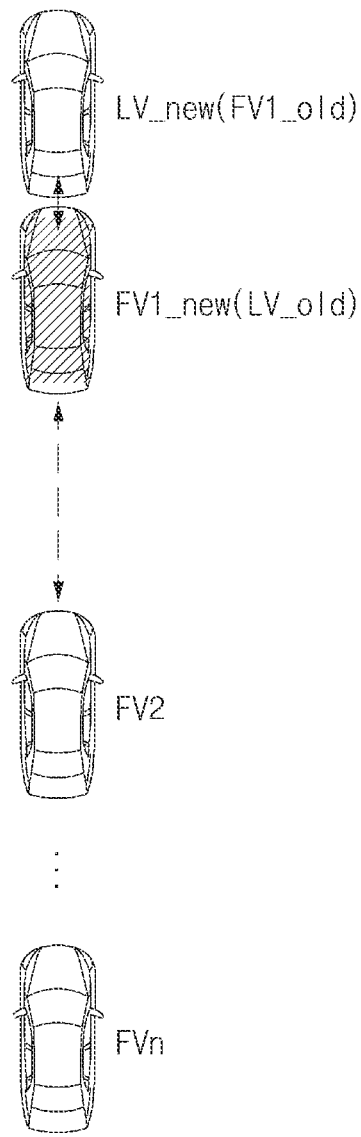
FIG. 3A is a drawing illustrating a braking control method when the brake of a leading vehicle breaks down during platooning according to an embodiment of the present disclosure.
Figure 3B:
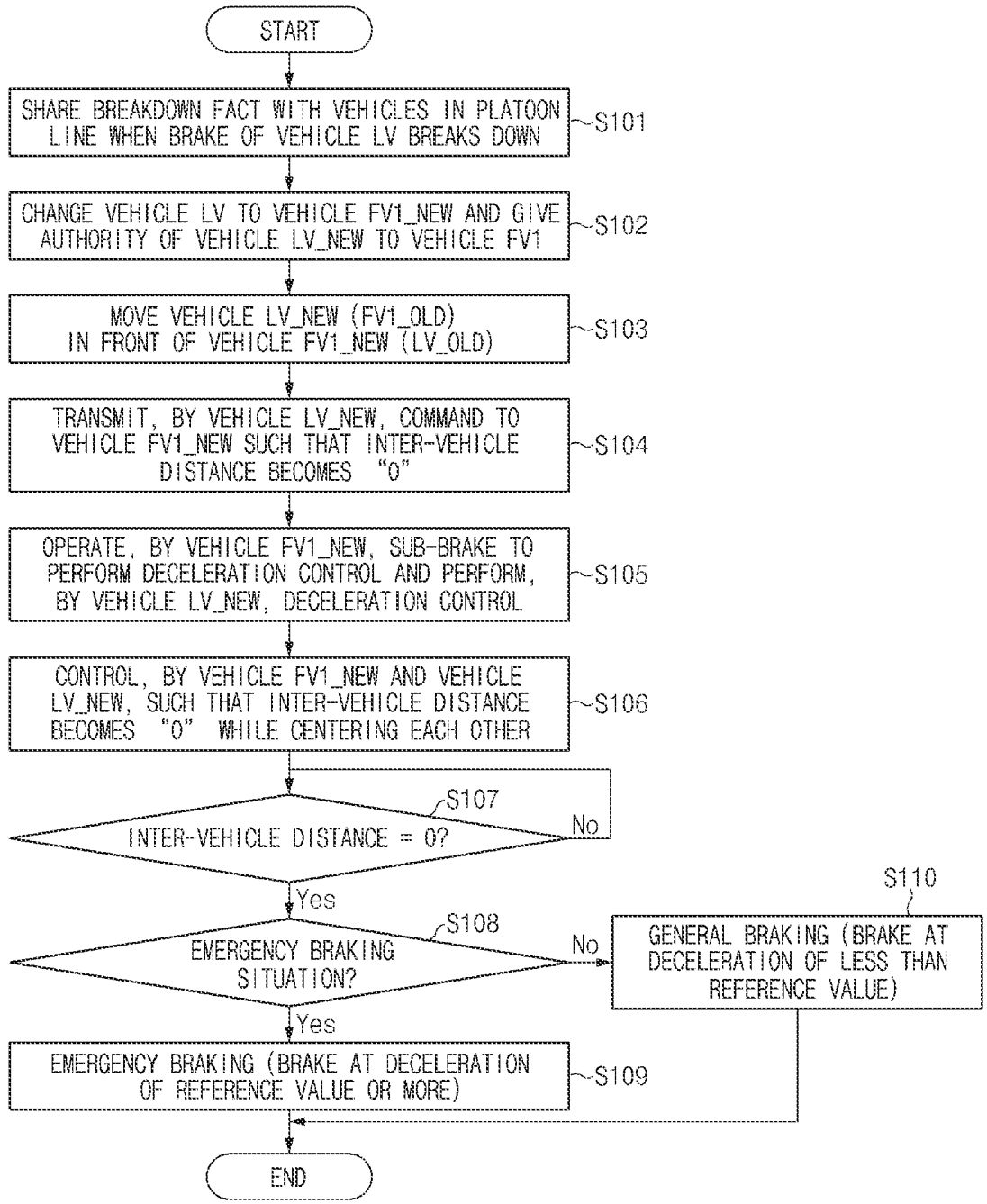
FIG. 3B is a flowchart illustrating a braking control method when the brake of a leading vehicle breaks down during platooning according to an embodiment of the present disclosure.

FIG. 3A is a drawing illustrating a braking control method when the brake of a leading vehicle breaks down during platooning according to an embodiment of the present disclosure, FIG. 3B is a flowchart illustrating a braking control method when the brake of a leading vehicle breaks down during platooning according to an embodiment of the present disclosure. FIG. 3C is a drawing illustrating vehicle deployment upon braking control when the brake of a leading vehicle breaks down during platooning according to an embodiment of the present disclosure. Hereinafter, it is assumed that a platooning controller 100 of FIG. 1 performs a process of FIG. 3B. Furthermore, in a description of FIG. 3B, an operation described as being performed by each of the platooning vehicles may be understood as being performed by a platooning controller 100 loaded into each of the platooning vehicles and may also be understood as being controlled by a processor 130 of the platooning controller 100.

Referring to FIGS. 3A and 3B, in S101, when the brake of a vehicle (a leading vehicle) LV breaks down, the platooning controller 100 of the vehicle LV may share the breakdown fact with following vehicles in a platoon line. In this case, a following vehicle FV1 may provide the vehicle LV with an inter-vehicle distance from the forward vehicle, a current vehicle speed, an offset amount of the vehicle center from the forward vehicle, or the like. Furthermore, each of following vehicles FV2 to FVn may transmit information such as an inter-vehicle distance or a vehicle speed to the vehicle LV.

In S102, the platooning controller 100 of the vehicle LV may change the vehicle LV to the vehicle FV1_new and may give the authority of the vehicle LV_new to the vehicle FV1 through vehicle-to-vehicle (V2V) communication.

Figure 3C:
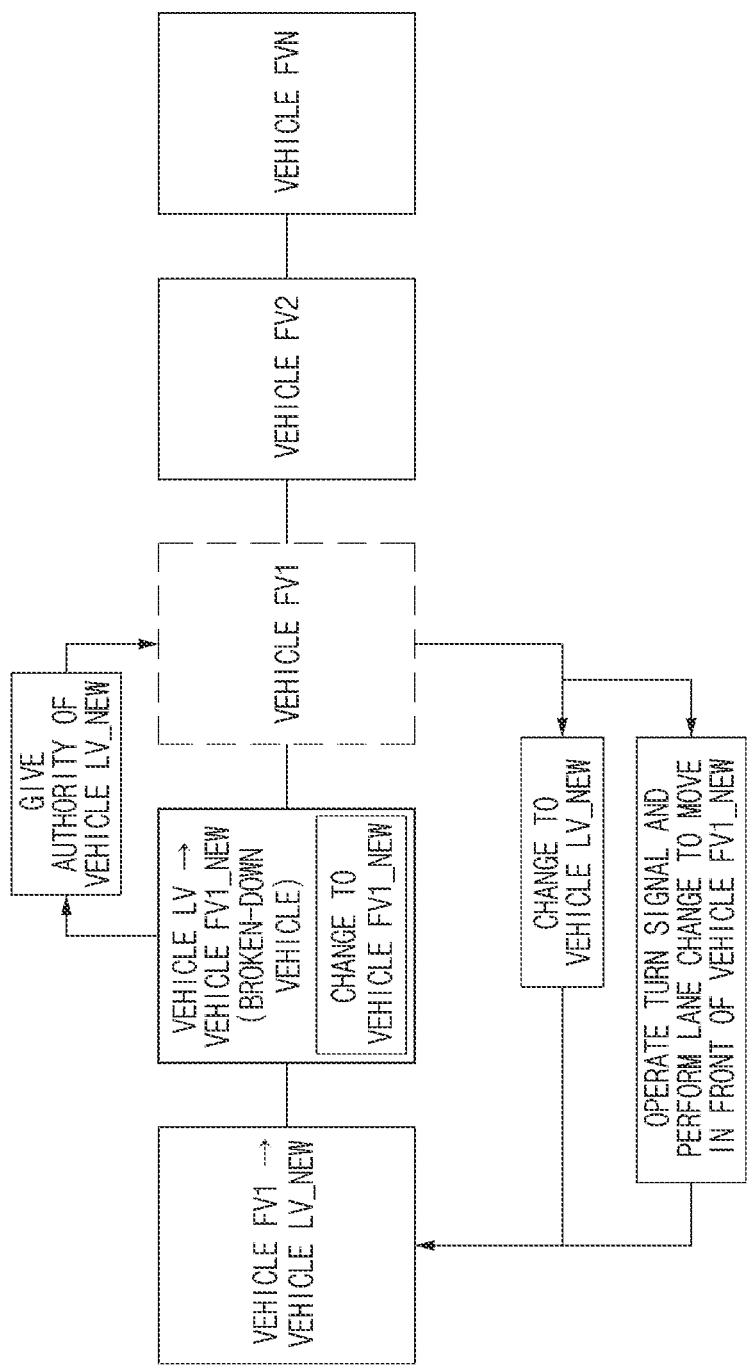
FIG. 3C is a drawing illustrating vehicle deployment upon braking control when the brake of a leading vehicle breaks down during platooning according to an embodiment of the present disclosure.

Thus, as shown in FIGS. 3A and 3C, in S103, the platooning controller 100 of the vehicle LV may control the vehicle LV_new(FV1_old) to move in front of the vehicle FV1_new(LV_old). In this case, the vehicle LV_new (FV1_old) may operate its turn signal and may perform a lane change to move in front of the vehicle FV1_new (LV_old).

In S104, the platooning controller 100 of the vehicle LV_new may transmit a control command to the vehicle FV1_new through V2V communication such that an inter-vehicle distance from the forward vehicle becomes "0".

Thus, in S105, the platooning controller 100 of the vehicle FV1_new may operate a sub-brake of the vehicle FV1_new to perform deceleration control and the platooning controller too of the vehicle LV_new may perform deceleration control, such that an inter-vehicle distance between the vehicle LV_new and the vehicle FV1_new becomes "0". In this case, the platooning controller 100 of the vehicle LV may request the other following vehicles FV2 to FVn to control an inter-vehicle distance to a certain distance.

Furthermore, in S106, the vehicle FV1_new and the vehicle LV_new may control such that an inter-vehicle distance therebetween becomes "0" while centering each other.

To make a rotational moment of each of the vehicle FV1_new and the vehicle LV_new "0" when the vehicle FV1_new and the vehicle LV_new brake, the platooning controller too loaded into each of the vehicle FV1_new and the vehicle LV_new may center the vehicle LV_new and the vehicle FV1_new using a camera 210 and may simultaneously control such that an inter-vehicle distance becomes 0 m using a radar 220.

In S107, the platooning controller 100 of the vehicle LV_new may continue monitoring whether an inter-vehicle distance between the vehicle FV1_new and the vehicle LV_new becomes "0".

When the vehicle FV1_new and the vehicle LV_new becomes "0" (Yes at S107), that is, when the vehicle FV1_new and the vehicle LV_new are in contact with each other, in S108, the platooning controller 100 of the vehicle LV_new may determine whether the forward road situation is an emergency braking situation or a general braking situation using the radar 220 and the camera 210.

In other words, the platooning controller 100 of the vehicle LV_new may calculate a speed of the vehicle LV_new and a distance from a forward obstacle to determine whether it is possible to avoid a collision with the forward obstacle. When it is impossible to avoid the collision with the forward obstacle and when the distance from the forward obstacle is short, the platooning controller 100 of the vehicle LV_new may determine the forward road situation as an emergency braking situation. When it is possible to avoid the collision with the forward obstacle and when the distance from the forward obstacle is long, the platooning controller 100 of the vehicle LV_new may determine the forward road situation as a general braking situation.

When it is determined that the forward road situation is the emergency braking situation (Yes at S108), in S109, the platooning controller 100 of the vehicle LV_new may perform high-deceleration control over a predetermined reference value (e.g., 0.4 g). When it is determined that the forward road situation is the general braking situation (No at S108), in S110, the platooning controller 100 of the vehicle LV_new may perform low-deceleration control below the predetermined reference value to control such that the vehicle LV_new brakes slowly.

To prevent a rear-end collision with a following vehicle while S104 to S110 are performed, as shown in FIG. 3A, the platooning controller 100 of the vehicle FV2 may increase and maintain an inter-vehicle distance from the forward vehicle to 2 times.

Hereinafter, a description will be given of a braking control method when the brake of a following vehicle located immediately behind a leading vehicle in a platoon line breaks down with reference to FIGS. 4A and 4B.

Figure 4A:
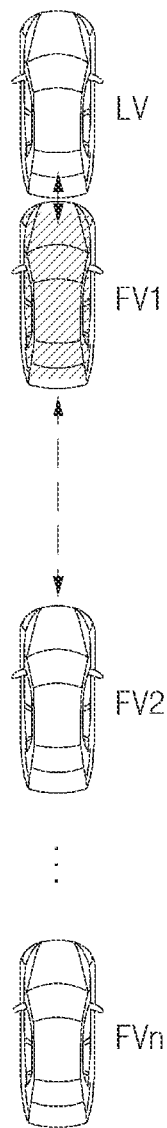
FIG. 4A is a drawing illustrating a braking control method when the brake of a following vehicle located immediately behind a leading vehicle in a platoon line breaks down according to an embodiment of the present disclosure.

FIG. 4A is a drawing illustrating a braking control method when the brake of a following vehicle located immediately behind a leading vehicle in a platoon line breaks down according to an embodiment of the present disclosure. FIG. 4B is a flowchart illustrating a braking control method when the brake of a following vehicle located immediately behind a leading vehicle in a platoon line breaks down according to an embodiment of the present disclosure.

Hereinafter, it is assumed that a platooning controller 100 of FIG. 1 performs a process of FIG. 4B. Furthermore, in a description of FIG. 4B, an operation described as being performed by each of the platooning vehicles may be understood as being performed by a platooning controller 100 loaded into each of the platooning vehicles and may also be understood as being controlled by a processor 130 of the platooning controller 100.

Figure 4B:
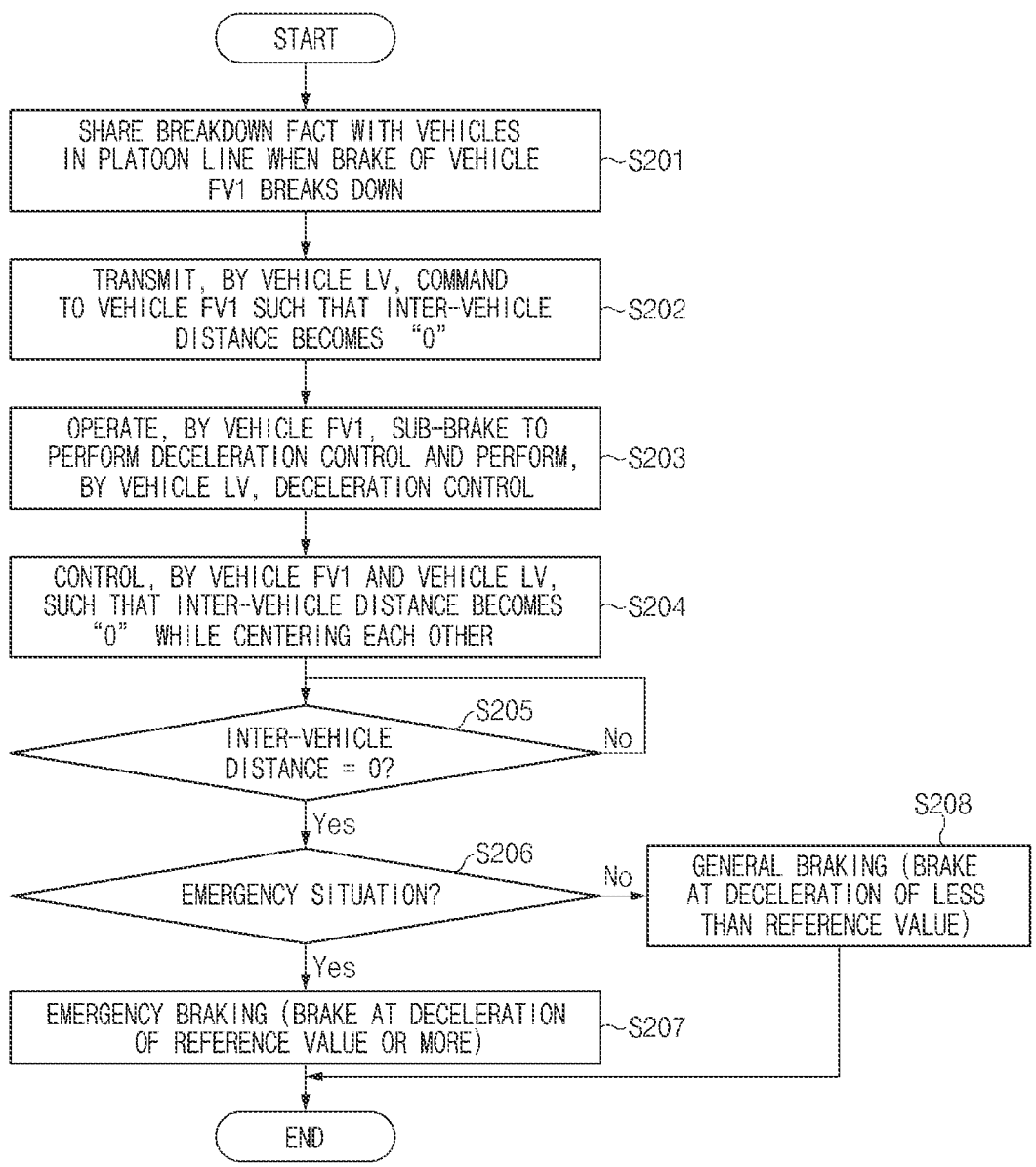
FIG. 4B is a flowchart illustrating a braking control method when the brake of a following vehicle located immediately behind a leading vehicle in a platoon line breaks down according to an embodiment of the present disclosure.

Referring to FIGS. 4A and 4B, in S201, when the brake of a vehicle FV1 which follows a vehicle LV immediately behind the vehicle LV breaks down, a platooning controller 100 of the vehicle FV1 may share the breakdown fact with following vehicles FV2 to FVn and the vehicle LV in a platoon line. In this case, the vehicle FV1 may provide the vehicle LV with an inter-vehicle distance from the forward vehicle, a current vehicle speed, an offset amount of the vehicle center from the forward vehicle, or the like. Furthermore, each of the following vehicles FV2 to FVn may transmit information such as an inter-vehicle distance or a vehicle speed to the vehicle LV.

In S202, the platooning controller 100 of the vehicle LV may transmit a control command to the vehicle FV1 through V2V communication such that an inter-vehicle distance from the forward vehicle becomes "0". In this case, the platooning controller 100 of the vehicle LV may request the other following vehicles FV2 to FVn to control an inter-vehicle distance to a certain distance.

Thus, in S203, the platooning controller 100 of the vehicle FV1 may operate a sub-brake of the vehicle FV1 to perform deceleration control and the platooning controller 100 of the vehicle LV may perform deceleration control, such that an inter-vehicle distance between the vehicle LV and the vehicle FV1 becomes "0".

In this case, in S204, the vehicle FV1 and the vehicle LV may control such that an inter-vehicle distance therebetween becomes "0" while centering each other. In other words, to make a rotational moment of each of the vehicle FV1 and the vehicle LV "0" when the vehicle FV1 and the vehicle LV brake, the platooning controller 100 loaded into each of the vehicle FV1 and the vehicle LV may center the vehicle LV and the vehicle FV1 using a camera 210 and may simultaneously control such that an inter-vehicle distance becomes 0 m using a radar 220.

In S205, the platooning controller 100 of the vehicle LV may continue monitoring whether an inter-vehicle distance between the vehicle FV1 and the vehicle LV becomes "0".

When the vehicle FV1 and the vehicle LV becomes "0" (Yes at S205), that is, when the vehicle FV1 and the vehicle LV are in contact with each other, in S206, the platooning controller too of the vehicle LV may determine whether the forward road situation is an emergency braking situation or a general braking situation using the radar 220 and the camera 210.

When it is determined that the forward road situation is the emergency braking situation (Yes at S206), in S207, the platooning controller 100 of the vehicle LV may perform high-deceleration control over a predetermined reference value (e.g., 0.4 g). When it is determined that the forward road situation is the general braking situation (No at S206), in S208, the platooning controller 100 of the vehicle LV may perform low-deceleration control below the predetermined reference value to control such that the vehicle LV brakes slowly.

To prevent a rear-end collision with a following vehicle while S204 to S208 are performed, as shown in FIG. 4A, the platooning controller 100 of the vehicle FV2 may increase and maintain an inter-vehicle distance from the forward vehicle to 2 times.

Hereinafter, a description will be given of a braking control method when the brake of a tail end vehicle in a platoon line breaks down with reference to FIGS. 5A to 5D.

Figure 5A:
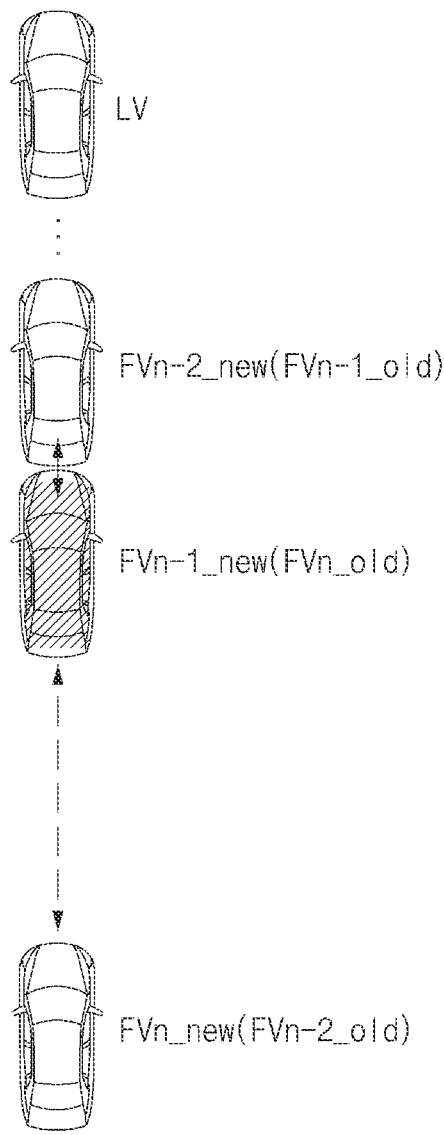
FIG. 5A is a drawing illustrating a braking control method when the brake of a tail end vehicle in a platoon line breaks down according to an embodiment of the present disclosure.
Figure 5B:
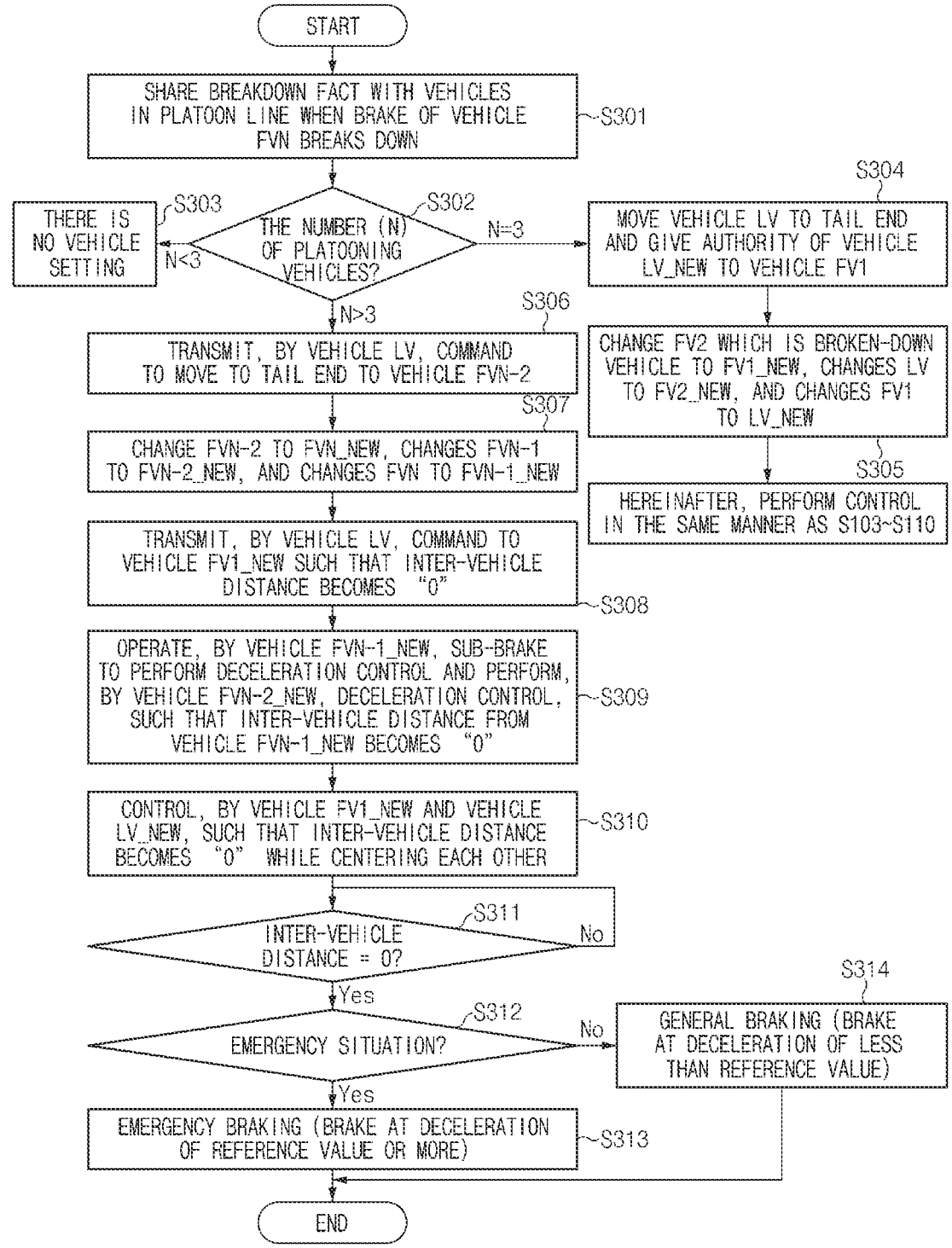
FIG. 5B is a flowchart illustrating a braking control method when the brake of a tail end vehicle in a platoon line breaks down according to an embodiment of the present disclosure.
Figure 5C:
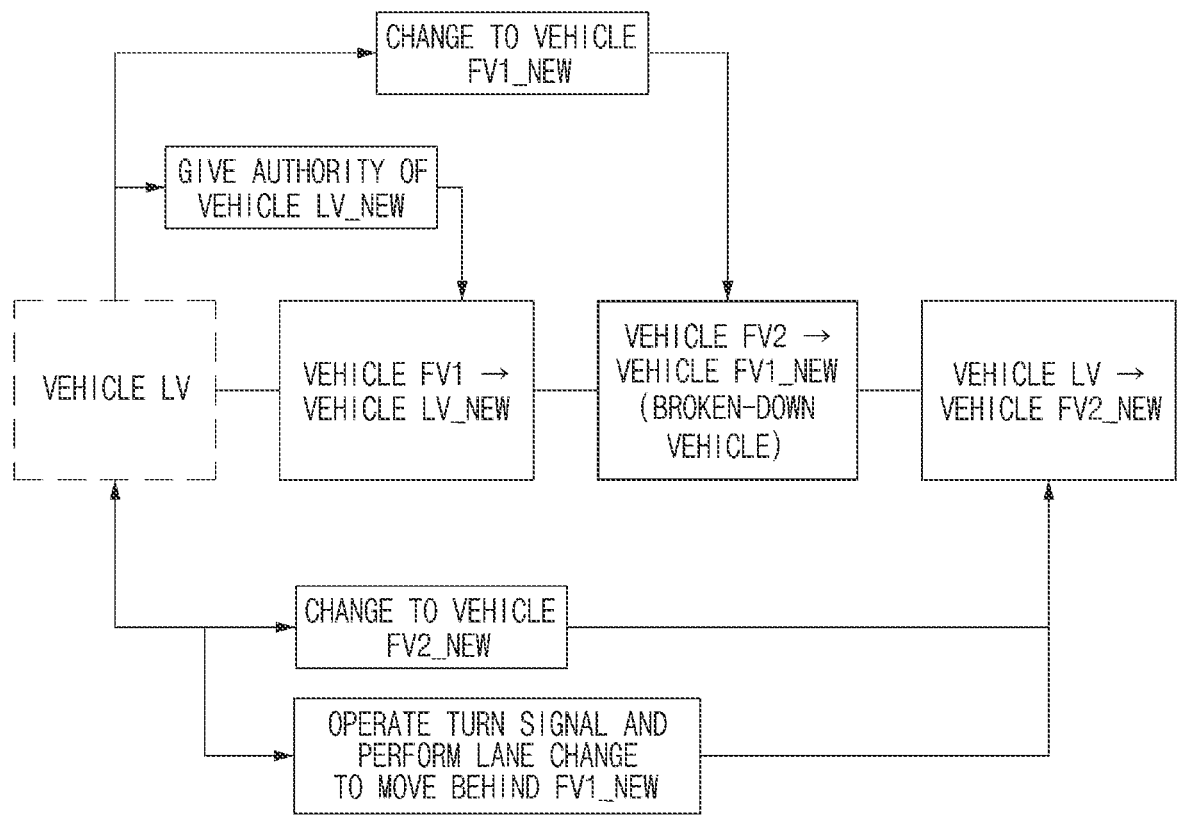
FIGS. 5C and 5D are drawings illustrating vehicle deployment upon braking control when the brake of a tail end vehicle in a platoon line breaks down according to an embodiment of the present disclosure.
Figure 5D:
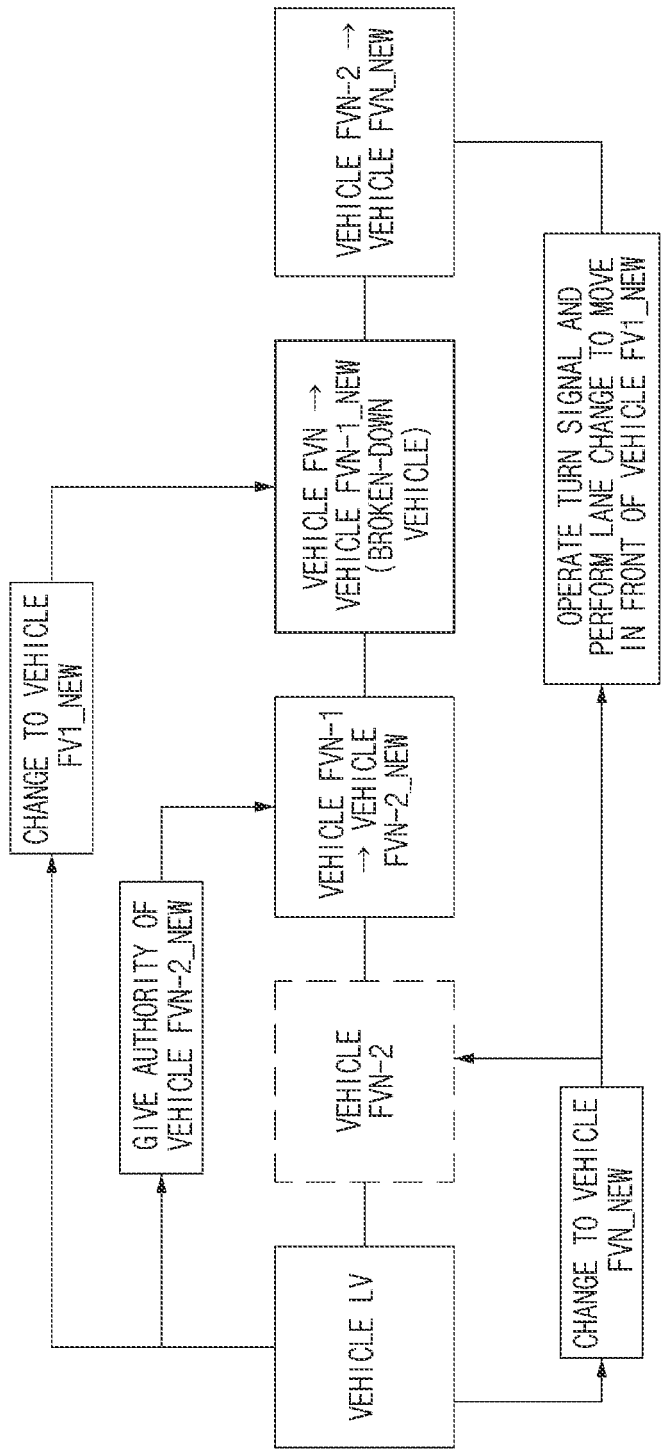

FIG. 5A is a drawing illustrating a braking control method when the brake of a tail end vehicle in a platoon line breaks down according to an embodiment of the present disclosure. FIG. 5B is a flowchart illustrating a braking control method when the brake of a tail end vehicle in a platoon line breaks down according to an embodiment of the present disclosure. FIGS. 5C and 5D are drawings illustrating vehicle deployment upon braking control when the brake of a tail end vehicle in a platoon line breaks down according to an embodiment of the present disclosure.

Hereinafter, it is assumed that a platooning controller 100 of FIG. 1 performs a process of FIG. 5B. Furthermore, in a description of FIG. 5B, an operation described as being performed by each of the platooning vehicles may be understood as being performed by a platooning controller 100 loaded into each of the platooning vehicles and may also be understood as being controlled by a processor 130 of the platooning controller 100.

Referring to FIGS. 5A and 5B, in S301, when the brake of a vehicle FVn which is a tail end vehicle breaks down, a platooning controller 100 of the vehicle FVn may share the breakdown fact with following vehicles FV2 to FVn and the vehicle LV in a platoon line. In this case, the vehicle FVn may provide the vehicle LV with an inter-vehicle distance from a forward vehicle, a current vehicle speed, an offset amount of the vehicle center from the forward vehicle, or the like. Furthermore, each of the following vehicles FV1 to FVn−1 may transmit information such as an inter-vehicle distance or a vehicle speed to the vehicle LV.

In S302, the platooning controller 100 of the vehicle LV may determine the number of platooning vehicles which participate in platooning. In S303, when the number of platooning vehicles is less than 3, the platooning controller 100 of the vehicle LV may fail to perform a vehicle setting for braking control.

When the number of the platooning vehicles is 3, in S304, the platooning controller too of the vehicle LV may move the vehicle LV to the tail end in the platoon line and may give the authority of the vehicle LV_new to the vehicle FV1.

In S305, the platooning controller 100 of the vehicle LV may change the vehicle FV2, which breaks down, to the vehicle FV1_new, may change the vehicle LV to the vehicle FV2_new, and may change the vehicle FV1 to the vehicle LV_new, thus performing the same process as S103 to S110 of FIG. 3B to perform braking control. FIG. 5C is an example where platooning vehicles are a total of 3 vehicles (LV, FV1, and FV2). It may be seen that the platooning controller 100 of the vehicle LV moves the vehicle LV behind the vehicle FV2 when the vehicle FV2 breaks down and gives the authority of the vehicle LV to the vehicle FV1 to reset vehicle deployment.

Meanwhile, when the number of platooning vehicles is greater than 3, in S306, the platooning controller 100 of the vehicle LV may transmit a command to move behind the tail end vehicle to the vehicle FVn−2 which is traveling immediately in front of the tail end vehicle through V2V communication.

In S307, the platooning controller 100 of the vehicle LV may change the vehicle FVn−2 to the vehicle FVn_new, may change the vehicle FVn−1 to the vehicle FVn−2_new, and may change the vehicle FVn (the broken-down vehicle) to the vehicle FVn−1_new.

In S308, the platooning controller 100 of the vehicle LV may transmit a control command to the vehicle FVn−1_new through V2V communication such that an inter-vehicle distance from the forward vehicle becomes "0".

Thus, in S309, the platooning controller 100 of the vehicle FVn−1_new may operate a sub-brake of the vehicle FVn−1_new to perform deceleration control and the platooning controller 100 of the vehicle FVn−2_new may perform deceleration control, such that an inter-vehicle distance between the vehicle FVn−2_new and the vehicle FVn−1_new becomes "0".

Furthermore, in S310, the vehicle FVn−2_new and the vehicle FVn−1_new may control such that an inter-vehicle distance therebetween becomes "0" while centering each other. In other words, to make a rotational moment of each of the vehicle FVn−2_new and the vehicle FVn−1_new "0" when the vehicle FVn−2_new and the vehicle FVn−1_new brake, the platooning controller 100 of each of the vehicle FVn−2_new and the vehicle FVn−1_new may center the vehicle FVn−2_new and the vehicle FVn−1_new using a camera 210 and may simultaneously control such that an inter-vehicle distance becomes 0 m using a radar 220.

In S311, the platooning controller 100 of the vehicle FVn−2_new may continue monitoring whether an inter-vehicle distance between the vehicle FVn−2_new and the vehicle FVn−1_new becomes "0".

When the inter-vehicle distance between the vehicle FVn−2_new and the vehicle FVn−1_new becomes "0" (Yes at S311), that is, when the vehicle FVn−2_new and the vehicle FVn−1_new are in contact with each other, in S312, the platooning controller 100 of the vehicle FVn−2_new may determine whether the forward road situation is an emergency braking situation or a general braking situation using the radar 220 and the camera 210.

When it is determined that the forward road situation is the emergency braking situation (Yes at S312), in S313, the platooning controller 100 of the vehicle FVn−2_new may perform high-deceleration control over a predetermined reference value (e.g., 0.4 g). When it is determined that the forward road situation is the general braking situation (No at S312), in S314, the platooning controller 100 of the vehicle FVn−2_new may perform low-deceleration control below the predetermined reference value to control such that the vehicle FVn−2_new brakes slowly.

To prevent a rear-end collision with a following vehicle while S308 to S314 are performed, as shown in FIG. 5A, the platooning controller 100 of the vehicle FVn_new may increase and maintain an inter-vehicle distance from the forward vehicle to 2 times.

FIG. 5D discloses an example where there are more than 3 platooning vehicles and where the tail end vehicle FVn breaks down and discloses an example where the vehicle FVn−2 moves to the tail end and resets vehicle deployment to perform braking control.

Hereinafter a description will be given of a braking control method when the brake of a following vehicle located in the middle of a platoon line breaks down with reference to FIGS. 6A and 6B.

Figure 6A:
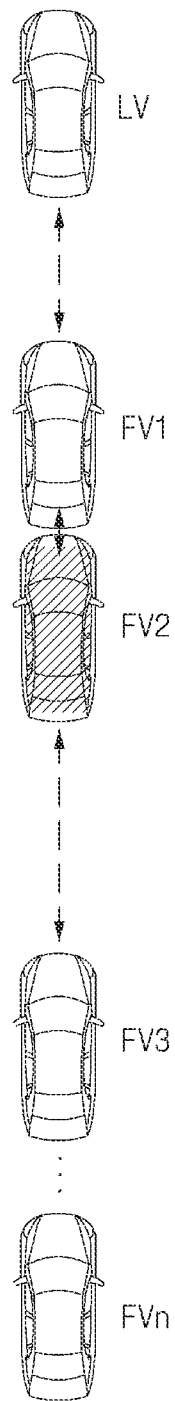
FIG. 6A is a drawing illustrating a braking control method when the brake of a following vehicle located in the middle of a platoon line breaks down according to an embodiment of the present disclosure.

FIG. 6A is a drawing illustrating a braking control method when the brake of a following vehicle located in the middle of a platoon line breaks down according to an embodiment of the present disclosure. FIG. 6B is a flowchart illustrating a braking control method when the brake of a following vehicle located in the middle of a platoon line breaks down according to an embodiment of the present disclosure.

Hereinafter, it is assumed that a platooning controller 100 of FIG. 1 performs a process of FIG. 6B. Furthermore, in a description of FIG. 6B, an operation described as being performed by each of the platooning vehicles may be understood as being performed by a platooning controller 100 loaded into each of the platooning vehicles and may also be understood as being controlled by a processor 130 of the platooning controller 100.

Figure 6B:
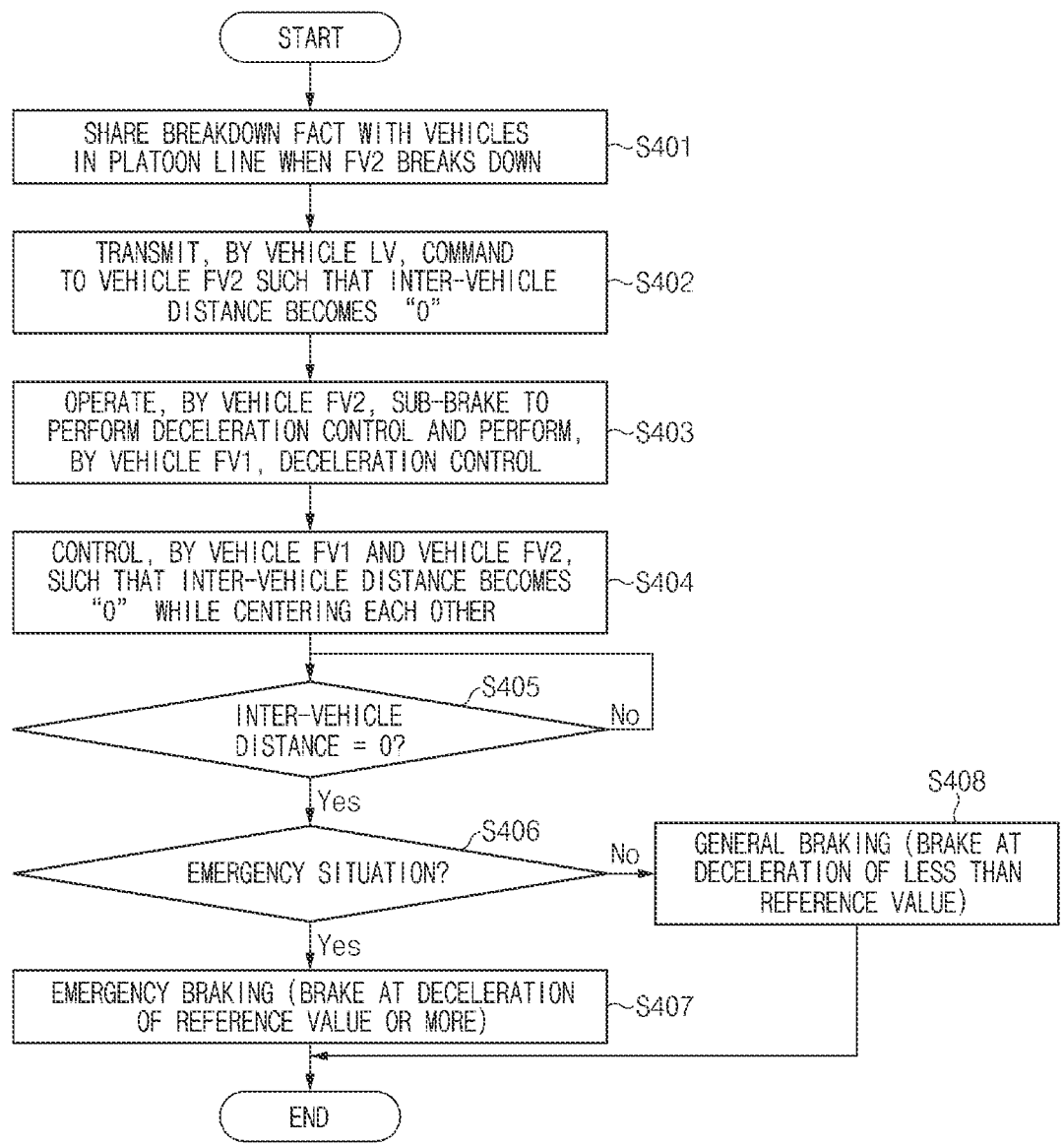
FIG. 6B is a flowchart illustrating a braking control method when the brake of a following vehicle located in the middle of a platoon line breaks down according to an embodiment of the present disclosure.

Referring to FIGS. 6A and 6B, in S401, when the brake of a vehicle FV2 breaks down, a platooning controller 100 of the vehicle FV2 may share the breakdown fact with following vehicles FV1 and FV3 to FVn and a vehicle LV in a platoon line. In this case, the vehicle FV1 may provide the vehicle LV with an inter-vehicle distance from a forward vehicle, a current vehicle speed, an offset amount of the vehicle center from the forward vehicle, or the like. Furthermore, each of the following vehicles FV2 to FVn may transmit information such as an inter-vehicle distance or a vehicle speed to the vehicle LV.

In S402, the platooning controller 100 of the vehicle LV may transmit a control command to the vehicle FV2 through V2V communication such that an inter-vehicle distance from the forward vehicle becomes "0". In this case, the platooning controller 100 of the vehicle LV may request the other following vehicles FV1 and FV3 to FVn to control an inter-vehicle distance to a certain distance.

Thus, in S403, the platooning controller 100 of the vehicle FV2 may operate a sub-brake of the vehicle FV2 to perform deceleration control and the platooning controller 100 of the vehicle FV1 may perform deceleration control, such that an inter-vehicle distance between the vehicle FV1 and the vehicle FV2 becomes "0".

In this case, in S404, the vehicle FV1 and the vehicle FV2 may control such that an inter-vehicle distance therebetween becomes "0" while centering each other. In other words, to make a rotational moment of each of the vehicle FV1 and the vehicle FV2 "0" when the vehicle FV1 and the vehicle FV2 brake, the platooning controller 100 loaded into each of the vehicle FV1 and the vehicle FV2 may center the vehicle FV2 and the vehicle FV1 using a camera 210 and may simultaneously control such that an inter-vehicle distance becomes 0 m using a radar 220.

In S405, the platooning controller 100 of the vehicle FV2 may continue monitoring whether an inter-vehicle distance between the vehicle FV1 and the vehicle FV2 becomes "0".

When the inter-vehicle distance between the vehicle FV1 and the vehicle FV2 becomes "0" (Yes at S405), that is, when the vehicle FV1 and the vehicle FV2 are in contact with each other, in S406, the platooning controller 100 of the vehicle FV2 may determine whether the forward road situation is an emergency braking situation or a general braking situation using the radar 220 and the camera 210.

When it is determined that the forward road situation is the emergency braking situation (Yes at S406), in S407, the platooning controller 100 of the vehicle FV2 may perform high-deceleration control over a predetermined reference value (e.g., 0.4 g). When it is determined that the forward road situation is the general braking situation (No at S406), in S408, the platooning controller 100 of the vehicle FV2 may perform low-deceleration control below the predetermined reference value to control such that the vehicle FV2 brakes slowly.

To prevent a rear-end collision with a following vehicle while S402 to S408 are performed, as shown in FIG. 6A, the platooning controller 100 of the vehicle FV3 may increase and maintain an inter-vehicle distance from the forward vehicle to 2 times.

As such, when there is a vehicle, the brake of which breaks down, among vehicles in a platoon line during platooning, an embodiment of the present disclosure may ensure stability of the vehicle using a control strategy of sharing information about the broken-down vehicle and safely stopping the vehicle.

Figure 7:
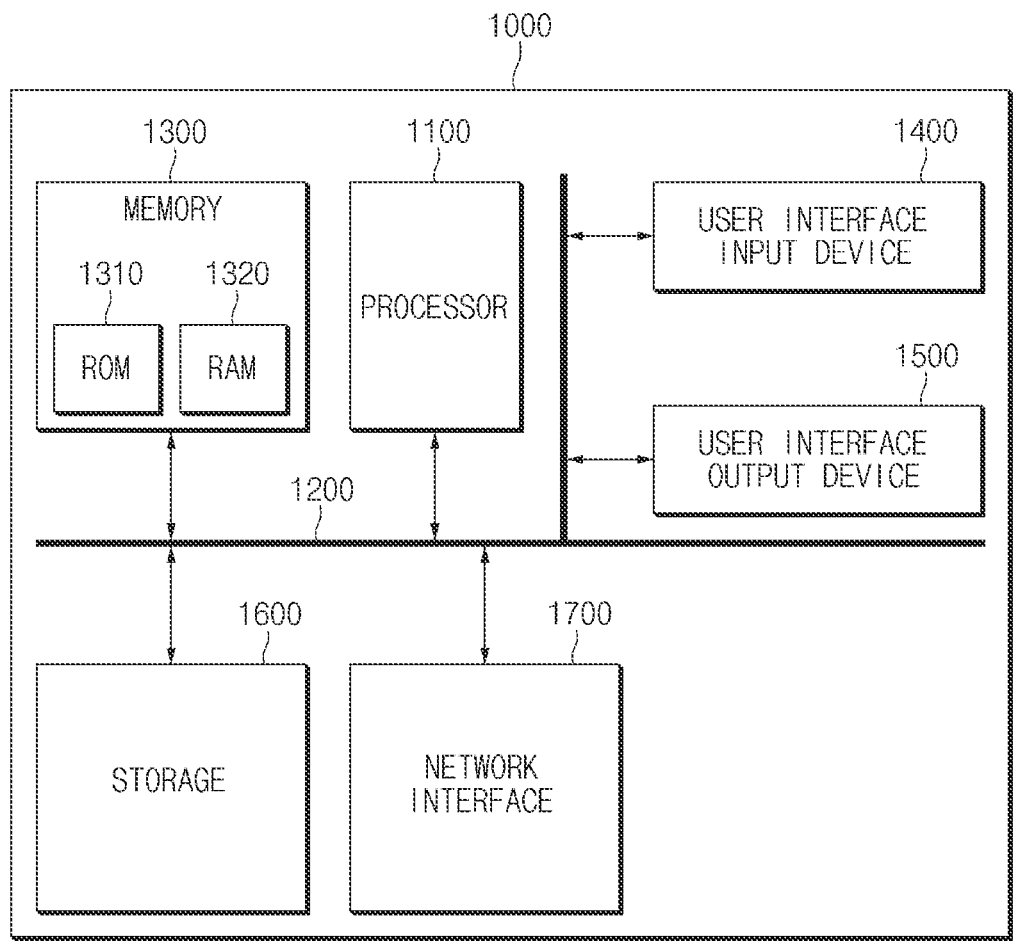
FIG. 7 is a block diagram illustrating a computing system according to an embodiment of the present disclosure.

FIG. 7 is a block diagram illustrating a computing system according to an embodiment of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may actively perform braking control of a vehicle, the brake of which breaks down, during platooning depending on a surrounding road situation, thus reducing a braking distance and stopping the vehicle, the brake of which breaks down, without collision or damage with a surrounding vehicle.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A platooning controller comprising:
   a processor configured to share information about a first platooning vehicle of a group of platooning vehicles with other platooning vehicles of the group of platooning vehicles when a brake of the first platooning vehicle breaks down during platooning and to perform braking control; and
   a non-transitory storage medium configured to store data and an algorithm for platooning and braking control by the processor,
   wherein, to perform the braking control, the processor is configured to execute the algorithm to rearrange the group of platooning vehicles depending on a location where the first platooning vehicle is arranged in a platoon line so that a second platooning vehicle is arranged in front of the first platooning vehicle, to decelerate the first platooning vehicle and the second platooning vehicle that is in front of the first platooning vehicle, and to center the first platooning vehicle and the second platooning vehicle that is in front of the first platooning vehicle.

2. The platooning controller of claim 1, wherein the processor is configured to execute the algorithm to control the first platooning vehicle such that an inter-vehicle distance between the first platooning vehicle and the second platooning vehicle becomes "0" in a state where the first platooning vehicle and the second platooning vehicle are centered.

3. The platooning controller of claim 2, wherein the processor is configured to execute the algorithm to determine whether a road situation is an emergency braking situation or a general braking situation, when the inter-vehicle distance between the first platooning vehicle and the second platooning vehicle becomes "0".

4. The platooning controller of claim 3, wherein the processor is configured to execute the algorithm to:
   determine the road situation as the emergency braking situation when a distance from a forward obstacle is short and when it is impossible to avoid a collision with the forward obstacle; and
   determine the road situation as the general braking situation when the distance from the forward obstacle is long and when it is possible to avoid the collision with the forward obstacle.

5. The platooning controller of claim 4, wherein the processor is configured to execute the algorithm to:
   control the second platooning vehicle to brake at a deceleration of a predetermined reference value or more when the road situation is the emergency braking situation; and
   control the second platooning vehicle to brake at a deceleration of less than the predetermined reference value when the road situation is the general braking situation.

6. The platooning controller of claim 1, wherein the first platooning vehicle is a leading vehicle among the group of platooning vehicles, and wherein the processor is configured to execute the algorithm to:
give an authority of the leading vehicle to a first following vehicle behind the leading vehicle; and
control the first following vehicle to move in front of the leading vehicle when the brake of the leading vehicle breaks down so that the leading vehicle becomes the second platooning vehicle.

7. The platooning controller of claim 1, wherein the second platooning vehicle is a leading vehicle of the group of platooning vehicles, and wherein the processor is configured to execute the algorithm to perform deceleration control using a main braking device of the second platooning vehicle and perform deceleration control using a sub-braking device of the first platooning vehicle, such that an inter-vehicle distance between the second platooning vehicle and the first platooning vehicle becomes "0", when the brake of the first platooning vehicle breaks down.

8. The platooning controller of claim 1, wherein a tail end vehicle of the group of platooning vehicles is the first platooning vehicle, and wherein the processor is configured to execute the algorithm to determine a number of platooning vehicles in the group of platooning vehicles when the brake of the first platooning vehicle breaks down.

9. The platooning controller of claim 8, wherein the processor is configured to transmit a command to move behind the tail end vehicle to a vehicle in front of the tail end vehicle, when the number of platooning vehicles is greater than a predetermined number.

10. The platooning controller of claim 9, wherein the processor is configured to transmit a control command to the first platooning vehicle such that an inter-vehicle distance between the first platooning vehicle and the second platooning vehicle becomes "0".

11. The platooning controller of claim 10, wherein the processor is configured to execute the algorithm to:
control the first platooning vehicle to perform deceleration control using a sub-braking device; and
control the second platooning vehicle to perform deceleration control using a main braking device.

12. The platooning controller of claim 8, wherein the processor is configured to execute the algorithm to control a leading vehicle of the group of platooning vehicles to move to a tail end position in the platoon line when the number of platooning vehicles is 3.

13. The platooning controller of claim 1, wherein the processor is configured to execute the algorithm to control a third platooning vehicle behind the first platooning vehicle to increase an inter-vehicle distance between the first platooning vehicle and the third platooning vehicle during braking control of the first platooning vehicle.

14. A vehicle comprising:
a sensing device configured to sense information for platooning;
a sub-braking device configured to brake when a main braking device breaks down; and
a vehicle platooning controller configured to:
share information about the vehicle when the vehicle is one of a group of platooning vehicles in a platoon line and when a brake of the vehicle breaks down during platooning;
receive instructions to rearrange the group of platooning vehicles depending on a location where the vehicle is arranged in the platoon line so that a second platooning vehicle is arranged in front of the vehicle;
receive instructions to decelerate the vehicle along with the second platooning vehicle that is in front of the vehicle; and
receive instructions to center the vehicle and the second platooning vehicle.

15. The vehicle of claim 14, wherein the sensing device is configured to sense an inter-vehicle distance between the second platooning vehicle in front of the vehicle and a third platooning vehicle behind the vehicle, a vehicle speed, or an offset amount of the center of the second platooning vehicle in front of the vehicle.

16. A braking control method comprising:
sharing information about a first platooning vehicle in a group of platooning vehicles with other platooning vehicles in the group of platooning vehicles when a brake of the first platooning vehicle breaks down during platooning;
rearranging the group of platooning vehicles depending on a location where the first platooning vehicle is arranged in a platoon line so that a second platooning vehicle is arranged in front of the first platooning vehicle;
decelerating the first platooning vehicle and the second platooning vehicle that is in front of the first platooning vehicle; and
centering the first platooning vehicle and the second platooning vehicle that is in front of the first platooning vehicle.

17. The braking control method of claim 16, wherein performing the braking control comprises controlling the first platooning vehicle such that an inter-vehicle distance between the first platooning vehicle and the second platooning vehicle becomes "0" in a state where the first platooning vehicle and the second platooning vehicle are centered.

18. The braking control method of claim 17, wherein performing the braking control comprises:
determining whether a road situation is an emergency braking situation or a general braking situation when the inter-vehicle distance between the first platooning vehicle and the second platooning vehicle becomes "0";
controlling the second platooning vehicle at a deceleration of a predetermined reference value or more when the road situation is the emergency braking situation; and
controlling the second platooning vehicle at a deceleration of less than the predetermined reference value when the road situation is the general braking situation.

19. The braking control method of claim 16, wherein the first platooning vehicle is a leading vehicle of the group of platooning vehicles and wherein rearranging the group of platooning vehicles comprises:
giving an authority of the leading vehicle to a first following vehicle; and
controlling the first following vehicle to move in front of the leading vehicle when a brake of the leading vehicle breaks down, wherein the first following vehicle is then the second platooning vehicle.

20. The braking control method of claim 16, wherein the second platooning vehicle is a leading vehicle of the group of platooning vehicles and wherein rearranging the group of platooning vehicles comprises performing deceleration control using a main braking device of the leading vehicle and performing deceleration control using a sub-braking device of the first platooning vehicle, when the brake of the first platooning vehicle breaks down.

\* \* \* \* \*